United States Patent
Stansell et al.

[15] 3,658,679
[45] Apr. 25, 1972

[54] SYSTEM FOR DETERMINING THE HYDROGEN ION CONCENTRATION OF FLOWING LIQUIDS

[72] Inventors: Marion J. Stansell; Chandler S. Cheek, both of San Antonio, Tex.

[73] Assignee: The United States of America as represented by the Secretary of the Air Force

[22] Filed: Apr. 14, 1969

[21] Appl. No.: 815,602

[52] U.S. Cl. .................................................204/195 G
[51] Int. Cl. .....................................................G01n 27/36
[58] Field of Search ...........................204/1 T, 195 G, 195 R

[56] References Cited

UNITED STATES PATENTS

| | | | |
|---|---|---|---|
| 2,383,450 | 8/1945 | Coleman | 204/195 G |
| 3,216,915 | 11/1965 | Arthur et al. | 204/195 G |
| 3,250,688 | 10/1966 | Arthur | 204/195 G |
| 3,398,079 | 8/1968 | Arthur et al. | 204/195 G |
| 3,424,664 | 1/1969 | Severinghaus | 204/195 G |

*Primary Examiner*—T. Tung
*Attorney*—Harry A. Herbert, Jr. and William J. O'Brien

[57] ABSTRACT

An enclosed electrode assembly for determining the pH of minute samples of continuously or intermittently flowing liquids. The assembly includes a reference electrode comprised of an elongated tube and a half-cell element positioned within the tube and immersed within a continuously flowing electrolyte. Also included is an indicating electrode comprising an ion sensitive capillary tube, an electrolyte surrounding the capillary and a half-cell element immersed in the electrolyte. The capillary tube, containing a sample to be tested, connects to the elongated tube at an angle and forms a juncture for establishing direct electrical continuity between the flowing sample, the reference electrode, the indicating electrode and an external measuring circuit for determining pH.

2 Claims, 2 Drawing Figures

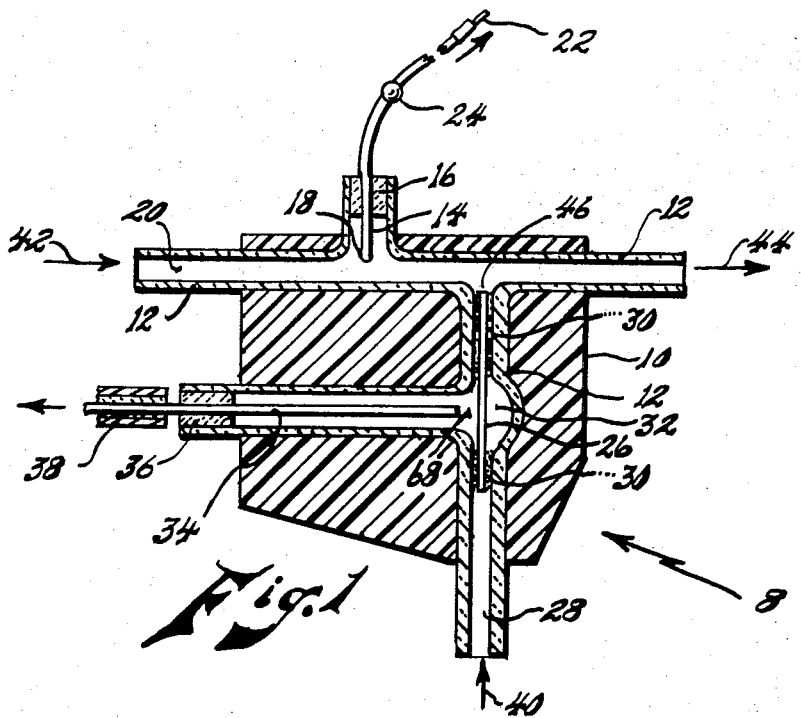
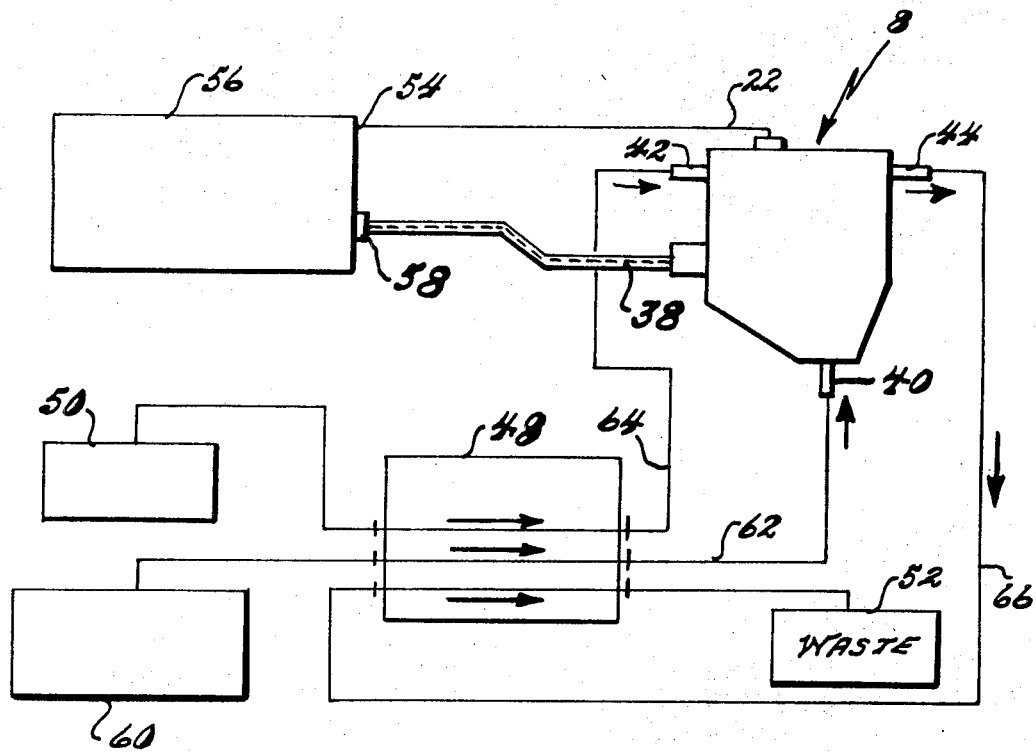

SYSTEM FOR DETERMINING THE HYDROGEN ION CONCENTRATION OF FLOWING LIQUIDS

BACKGROUND OF THE INVENTION

This invention relates to an electrode assembly for measuring the hydrogen ion concentration of a flowing liquid. More particularly, this invention concerns itself with an enclosed system for the measurement of the hydrogen ion concentration in minute samples of continuously or intermittently flowing biological fluids such as blood and the like.

The constant monitoring of the pH of biological fluids has become an important and integral part of modern medical procedures. For example, in open heart surgery, the continuous monitoring of blood pH permits surgeons to quickly anticipate various contingencies and thereby take whatever action is needed to counter their adverse effects. If these pH determinations are to be useful, however, it is necessary that they be made continuously, accurately and as rapidly as possible with essentially a zero lag time. The elimination of the necessity of disassembling and cleaning of the monitoring device with the concurrent danger of contamination occurring during such disassembly is also of great importance. The need, therefore, for an enclosed and efficient automated system for the anaerobic measurement of pH becomes obvious if the continuous monitoring of blood pH is to be maintained during lengthy surgical procedures.

A number of systems have been suggested, heretofore, in an attempt to satisfy this need. One such system is enclosed and provides anaerobic determinations. However, it does not provide for the uninterrupted monitoring of the pH of minute samples of continuously or intermittently flowing biological fluids. The present invention, on the other hand, overcomes this problem and provides an enclosed, compact, ruggedized assembly for measuring the hydrogen ion concentration in minute samples of flowing liquids.

SUMMARY OF THE INVENTION

In accordance with this invention, the uninterrupted monitoring of the pH of minute samples of a continuously or intermittently flowing liquid, such as blood, is accomplished by an enclosed system in which the liquid sample is introduced into a cylindrical, fine-bore capillary constructed from a hydrogen ion permeable material such as glass or Teflon. The capillary comprises the ion sensitive membrane surface of a glass electrode. The liquid sample traverses the capillary and immediately enters an elongated tube, such as a glass conduit, through which is flowing a cross stream of an electrolyte solution, such as a saturated, aqueous solution of potassium chloride. At this juncture, direct continuity is established with a reference electrode half cell element, such as a mercurous chloride-mercury disk seated in the wall of the elongated tube and the flowing electrolyte. This system, maintained at a constant temperature, permits the accurate and precise sequential or continuous measurement of pH in critical biological fluids, such as whole blood, or in solutions from laboratory or industrial processes. The electrode assembly is embedded within a high impact plastic material, such as an epoxy or methylmethacrylate polymer. This permits the assembly to be used under rigorous physical conditions without danger of breakage or loss of stability.

Accordingly, the primary object of this invention is to provide an enclosed, compact and rugged assembly for the anaerobic and automated measurement of pH in flowing liquids.

Another object of this invention is to provide an electrode assembly for measuring the hydrogen ion concentration in minute samples of continuously or intermittently flowing biological fluids, such as blood and the like.

Still another object of this invention is to provide an electrode assembly for measuring the hydrogen ion potential in minute samples of a flowing liquid wherein direct electrical continuity between the flowing liquid, a reference electrode and an indicating electrode is established at a juncture by direct contact.

The above and still other objects and advantages of this invention will become readily apparent from the description of the invention which follows when taken in conjunction with the accompanying drawing.

BRIEF DESCRIPTION OF THE DRAWING

In the drawing:

FIG. 1 is a view in cross section of the electrode assembly of this invention; and FIG. 2 is a block diagram which shows the electrode assembly of FIG. 1 being utilized to establish the hydrogen ion concentration of a flowing liquid.

DESCRIPTION OF THE PREFERRED EMBODIMENT

With reference to the drawings, wherein like reference characters designate like or corresponding parts throughout the several views, there is shown in FIG. 1, an electrode assembly 8 comprising a body 10 of conventional form which may be molded from a solid plastic, such as an epoxy polymer, a methacrylate polymer, or other suitable high impact material. A system of glass tubing 12 is embedded in the body 10. A reference electrode, generally indicated at 14, is held firmly in place by means of a concentric leak-proof bushing 16. The reference electrode comprises a half-cell element 18 and a continuously flowing electrolyte 20 passing through tubing 12 along a horizontal plane. The half-cell element 18 may comprise a silver cylinder approximately one-eighth inch in diameter plated with silver chloride to form a silver-silver chloride system. Element 18 may also be composed of a mercurous chloride-mercury mixture in the form of a disc or some other suitable half-cell arrangement. Electrolyte 20 is preferably a saturated potassium chloride aqueous solution. Reference electrode 14 is connected to reference input 54 of an external measuring circuit 56 through conductor 22. The conductor 22 is soldered to the silver cylinder 18 at point 24. A capillary tube 26, approximately 0.6 mm inside diameter, of hydrogen-ion permeable glass is inserted concentrically into a larger capillary 28. It is sealed into the larger capillary 28 by means of a sealing material 30, such as an epoxy resin. The seal 30 provides separation between the internal volume of the capillary and the volume 32 surrounding the capillary. This latter volume is filled with an electrolyte 68 comprising a 0.1 N HCl solution. An internal electrode 34, composed of silver wire (16 gauge) plated with silver chloride, is immersed within the electrolyte 68. This wire extends through a bushing 36 and is soldered to a coaxial cable 38 leading to the electrode input 58 of the external measuring circuit 56.

In normal operation the capillary 28 is connected at inlet 40 through a peristaltic pump 48 to a sample source 60 containing a fluid to be tested for pH. Inlet means 42 is likewise connected through the peristaltic pump 48 to a source of potassium chloride 50. Outlet 44 leads to a waste reservoir 52 for recovery of the solutions if desired. Since the fluid from sample source 60 is pumped through the hydrogen-ion sensitive capillary 26 at a constant rate, the hydrogen ions equilibrate with the glass surface and participate in establishing an electrical potential in conjunction with the internal electrode 34. Because the epoxy seal 30 seals the capillary 26 within capillary 28, no 0.1 N HCl solution passes into the sample, nor does any sample pass directly into the internal electrolyte 68. The sample passes through the capillary 26 and emerges at point 46 where it establishes direct electrical continuity with the aqueous potassium chloride solution being continuously pumped in at inlet 42. The potassium chloride completely bathes the reference electrode 14 and the interface between the sample and the saturated potassium chloride solution at point 46 provides direct contact between the reference and hydrogen ion half cells. The resultant potential difference is used as the input to the pH meter 56 for subsequent measurement and pH determination.

During operation, the entire electrode assembly 8 is held in the horizontal plane so that the differential specific gravities of the potassium chloride solution and the test samples will not lead to flow turbulence and consequent unstable reference junction. Because of the horizontal configuration, the potassium chloride being pumped into inlet 42 at a constant rate flows evenly down the tube past point 46 and out outlet 44 to a waste reservoir. Since there is no back flow of sample into the area of the reference electrode 14, the reference output is relatively stable. Rapid equilibration of the sample hydrogen ion concentration with the internal electrode 34 is enhanced by the large area represented by the inner wall of capillary 26.

A block diagram of a measuring system utilizing the electrode assembly of FIG. 1 is shown in FIG. 2. The assembly 8 is mounted so that all fluids flow in a plane parallel to the horizontal. This may be achieved by securing the assembly to a conventional ring stand. An external measuring circuit found to be useful is the Fisher Accurmet Model 310 pH meter.

To standardize the test system shown in FIG. 2, a calibration buffer solution is pumped from source 60 through the sample line tubing 62 at the rate of 0.1 ml per minute. As soon as the buffer equilibrated with the hydrogen ion sensitive glass in assembly 8 (as evidenced by a relatively stable output), the pH meter 56 is set to the buffer value. Simultaneously with pumping the sample from source 60, the pump 48 also pumps aqueous potassium chloride at a rate of 0.13 ml per minute through tubing 64, and waste (sample plus potassium chloride) through tubing 66 at the rate of 0.23 ml per minute. Tubings 62, 64 and 66 are composed of conventional chemically inert plastic or metal tubing.

The entire system is closed once the various fluids are pumped through the pump 48. Following calibration, test samples were aspirated for 60 seconds and then pumped to the electrode chamber 8. The sampling was timed so that a brief air space (5 seconds) occurred between each sample. This air space served to clear the capillary 26 in preparation for each succeeding sample. The temperature was that of a carefully controlled ambient (22° C). The temperature of the electrode assembly 8 can be controlled by conventional means, such as by placing it in a constant temperature bath. Alternatively, nichrome wire may be placed throughout the plastic body 10 to control the temperature by means of a thermoresistor element and an external temperature controller. None of the temperature controlling devices are shown. The pH meter is read for each sample as soon as relative stability is achieved. This occurs in under 60 seconds for each sample. Also, the measurements are performed on less than 0.1 ml of sample which is substantially less than can be used with conventional dip-type electrode assemblies.

The effectiveness of the testing system of this invention is shown by the results obtained on both human serum and human urine samples. A serum sample was initially tested with a commercial pH meter and blood pH measuring accessory. Following standardization of the commercial unit at pH 7.4, the serum was found to be pH 7.42 after 60 seconds equilibration at 22° C. The same serum sample was then pumped into the test measuring system of FIG. 2, following standardization at pH 7.4 with pH 7.5 0.05M phosphate buffer, at the rate of 0.1 ml per minute and reached equilibration in 30 seconds at 22° C. This represents a flow volume of approximately 0.05 ml. The major electrolytes bearing on the pH reading were, of course, the hydrogen ion concentration, the sodium ion concentration and the bicarbonate ion concentration. The sodium concentration of 138 meq/L did not contribute to a positive pH error, and because the test system was completely enclosed, $CO_2$ loss did not contribute error. The equilibration pH of serum sample in the invention was pH 7.40. This is an average value since the meter wavered between 7.36 and 7.44 at equilibrium. The KCl flow rate employed during this test was 0.13 ml per minute.

A urine sample was also initially tested with a commercial pH meter and found to be pH 6.44. The commercial meter had been previously standardized at pH 7.00. The reading of pH 6.44 was attained after 60 seconds equilibration at 22° C. The same urine sample was then pumped into the system of FIG. 2 following standardization at pH 7.00 at the rate of 0.1 ml per minute and reached equilibrium in 40 seconds at 22° C. This represents a flow volume of approximately 0.07 ml. The major electrolytes bearing on the pH reading were the hydrogen ions and the sodium ions. The sodium error, apparently, was nearly comparable in both the instant invention and the commercial apparatus since the equilibrium pH in the invention was an average pH 6.47. (The meter wavered between 6.43 and 6.51 at equilibrium).

A series of buffer solutions were also tested for pH by using the test system of FIG. 2 and the electrode assembly of this invention. The buffers had labeled pH values of 4.00, 6.00, 7.00, 8.00, 9.00 and 11.00. The purpose of the test was to determine how rapidly the samples would equilibrate with the pH sensitive glass and to what degre intersample mixing would degrade performance. The buffers were sampled for 60 seconds each and were separated by a 5 second air space. In each case, equilibrium was obtained by 60 seconds at 22° C. The intermediate air space clearly moved the major volume of each buffer from the glass capillary leaving only a thin film which was effectively rinsed out by the succeeding buffer. Buffers were pumped at a rate of 0.1 ml per minute. The only buffer which measured in agreement with its label was that of pH 7.00 (the pH at which the meter had been standardized). The deviations exhibited by the remaining buffers were consistent with the known nonlinearity of the meter.

From a consideration of the foregoing, it can be seen that the present invention provides a highly effective electrode assembly for determining the pH of continuously or intermittently flowing biological fluids. The system finds particular application during lengthy surgical procedures in which the constant monitoring of blood pH provides the surgeon with an additional means for anticipating various contingencies within sufficient time to take whatever corrective action is needed.

The electrode assembly of this invention is especially effective because of the direct continuity which is established between the sample being tested and the reference electrode conductor. This permits a rapid response and equilibration. Being entirely enclosed minimizes gaseous exchange and its rugged construction permits use under rigorous physical conditions. The assembly provides for the continuous flow measurement of a pH under laminar conditions and the high surface to liquid ratio within the capillary results in sample conservation and rapid response and equilibration. A test system utilizing the assembly of this invention permits the rapid, precise and highly accurate determination of pH on a large number of biological fluids and provides a superior means of continuously monitoring the pH of laboratory and industrial processes without the risk of contamination.

While there has been described herein what is considered to be a preferred embodiment of this invention, it will be obvious to those skilled in the art that modifications and changes may be made without departing from the essence of the invention. It is therefore to be understood that the exemplary embodiment is illustrative and not restrictive of the invention, the scope of which is defined in the appended claims, and that all modifications that come within the means of the claims are intended to be included herein.

What is claimed is:

1. An electrode assembly for the anaerobic measurement of the pH in minute samples of flowing liquids including:
   solid body for supporting said assembly;
   an elongated tube having two ends positioned within said body and oriented in a horizontal plane,;
   means for causing the flow of a first electrolyte through said elongated tube;
   a reference half-cell element positioned within said elongated tube adapted to contact said first electrolyte to form a reference electrode;
   an indicating electrode positioned within said body and comprising a second liquid electrolyte and a half-cell element immersed within said second electrolyte;

an elongated capillary having a hydrogen ion permeable glass surface, said capillary adapted to contain a flowing liquid test sample and connected to said elongated tube at a point intermediate the said ends and at an angle substantially normal to the horizontal plane to form a junction area downstream of said reference half-cell element for establishing direct electrical continuity between a flowing liquid test sample and an external measuring circuit, said second liquid electrolyte surrounding and in contact with said capillary surface;

a first output lead extending from said indicating electrode for connection to an external measuring circuit;

and a second output lead extending said reference electrode half-cell element for connection to an external measuring circuit.

2. An assembly in accordance with claim 1 including means for simultaneously propelling the liquid test sample and the first electrolyte through said assembly at a predetermined rate of flow.

* * * * *